United States Patent [19]

Ohmi et al.

[11] Patent Number: 5,318,706
[45] Date of Patent: Jun. 7, 1994

[54] METHOD OF SUPPLYING DILUTE HYDROFLUORIC ACID AND APPARATUS FOR USE IN THIS METHOD FOR SUPPLYING THE ACID

[75] Inventors: Tadahiro Ohmi, Sendai; Nobuhiro Miki, Osaka; Matagoro Maeno, Izumi; Ryozi Hirayama, Sakai, all of Japan

[73] Assignee: Hashimoto Chemical Co., Ltd., Osaka, Japan

[21] Appl. No.: 846,233

[22] Filed: Mar. 6, 1992

[30] Foreign Application Priority Data

Mar. 6, 1991 [JP] Japan .................. 3-068022

[51] Int. Cl.$^5$ .................................. B01D 61/00
[52] U.S. Cl. .................................. 210/649; 210/653; 210/654; 95/16; 95/17
[58] Field of Search ............. 210/649, 640, 654, 256, 210/257.2, 321.64, 900, 321.79, 321.8, 321.87, 653, 500.42, 500.43, 500.27, 321.80; 95/16, 158, 17; 134/95.1; 423/462

[56] References Cited

U.S. PATENT DOCUMENTS

| | | | |
|---|---|---|---|
| 4,108,765 | 8/1978 | Lee | 210/640 |
| 4,199,445 | 4/1980 | Chiang et al. | 210/500.1 |
| 4,424,067 | 6/1984 | Tarasenko et al. | 55/16 |
| 4,633,893 | 1/1987 | McConnell et al. | 134/95.1 |
| 4,714,481 | 12/1987 | Matsuura et al. | 210/500.27 |
| 4,738,272 | 4/1988 | McConnell | 134/95.1 |
| 4,767,533 | 8/1988 | Fisher et al. | 210/321.64 |
| 5,064,538 | 11/1991 | Boeteng | 210/649 |
| 5,084,073 | 1/1992 | Prasad | 55/158 |
| 5,196,616 | 3/1993 | Lee et al. | 55/16 |

Primary Examiner—Frank Spear
Assistant Examiner—Ana M. Fortuna
Attorney, Agent, or Firm—Armstrong, Westerman, Hattori, McLeland & Naughton

[57] ABSTRACT

A method of preparing hydrofluoric acid of high purity at the point of use by causing molecular diffusion of hydrogen fluoride into ultrapure water through a resin membrane. The high-purity acid is available at the site of use free of contamination that would occur during transport from a site of preparation.

3 Claims, 2 Drawing Sheets

METHOD OF SUPPLYING DILUTE HYDROFLUORIC ACID AND APPARATUS FOR USE IN THIS METHOD FOR SUPPLYING THE ACID

BACKGROUND OF THE INVENTION

1. Field of the Invention

The present invention relates to a method of and apparatus for producing dilute hydrofluoric acid of ultrahigh purity which is useful as an etchant and cleaning agent for semiconductors.

2. Description of the Prior Art

The purity of chemicals for use in the wet process for producing semiconductors governs the properties of wafers, so that chemicals of higher quality are essential in providing semiconductor devices of higher packing density. Especially, dilute hydrofluoric acid and ultrapure water are most important for use in etching or cleaning in the final step of the wet process, as is well known.

Among other chemicals, hydrofluoric acid is presently purified to a superhigh level by techniques which have made the most remarkable progress, and the impurity concentration of the acid has reached the level of 0.1 ppb. Development attempts are under way to reduce the concentration to the order of parts per trillion (ppt).

However, the use of hydrofluoric acid presently involves storage of hydrofluoric acid of high concentration (usually 50% HF) in a container, transport to a storage tank, transfer from the tank to diluting equipment through piping, dilution of the acid usually to 0.1 to 0.5% HF and supply of the diluted acid to the point of use.

During the entire handling procedure including storage, transport, dilution and supply, the acid is contaminated with the impurities dissolving out from the piping, pump, filter, etc. into the acid and with the contaminants otherwise introduced thereinto and is thereby degraded to several ppb or possibly to hundreds of ppb in terms of impurity content when the acid is delivered to the site of use. Thus, although hydrofluoric acid of very high purity is developed as a product, the high purity is in no way available when the acid is to be used actually.

SUMMARY OF THE INVENTION

The main object of the present invention is to provide an entirely novel methods of direct dilution and supplying of hydrofluoric acid as purified acid into ultrahigh purity water to overcome the problem of the conventional supply method in that the acid, although having a superhigh purity, becomes contaminated by handling procedures including storage, transport, transfer and dilution. We have conducted research to overcome the foregoing problem and invented a novel principle of supplying hydrogen fluoride directly to an ultrapure water line at a constant rate in immediate proximity to the wet process. More specifically, we have found that hydrogen fluoride undergoes molecular diffusion through a resin membrane in accordance with the partial pressure of hydrogen fluoride and that the resin membrane has barrier properties against permeation of impurity ions through the membrane. Based on this principle, we have developed a method of delivering dilute hydrofluoric acid of specified concentration by connecting a concentrated hydrogen fluoride supply source to a line for supplying ultrapure water at a constant rate, with the resin membrane provided therebetween.

DETAILED DESCRIPTION OF THE INVENTION

Figure 1:
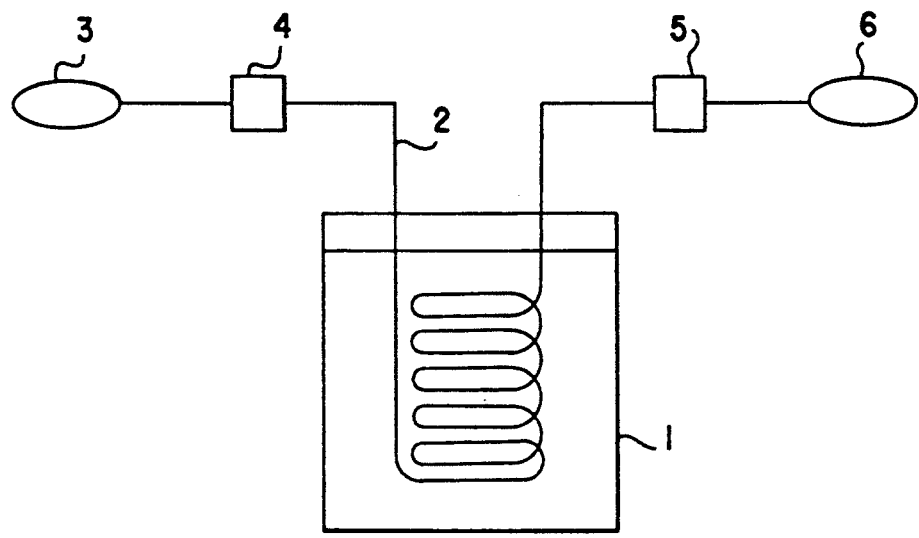
FIG. 1 is a diagram illustrating an apparatus embodying the invention.

The principle of the present invention will be described in greater detail.

We have conducted research on the rate of molecular diffusion of hydrogen fluoride through chemically stable resin membranes using various sources of hydrogen fluoride and found that the rate of permeation of hydrogen fluoride through the membrane is in proportion to the partial pressure of hydrogen fluoride on each side of the membrane. The hydrogen fluoride supply source can be concentrated hydrofluoric acid (e.g., 50% HF), or gas or liquid of 100% hydrogen fluoride, or diluted hydrogen fluoride gas. The concentration of hydrogen fluoride on the diluted side is dependent on the hydrogen fluoride partial pressure on the supply side. This means that ultrapure water can be converted to dilute hydrofluoric acid at a specified rate by using the resin membrane as means for obtaining the dilute acid instead of mixing concentrated hydrofluoric acid and ultrapure water together in a given ratio.

We have further found that the resin membrane has no ability whatever to pass impurity ions therethrough. The resin membrane has "properties to effect the molecular diffusion of hydrogen fluoride therethrough" and "barrier properties against the permeation of impurity ions therethrough." We ingeniously utilize these two types of properties to provide a system for continuously producing dilute hydrofluoric acid of specified concentration without any contamination directly from concentrated hydrofluoric acid or hydrogen fluoride in a liquid phase or gaseous phase, and ultrapure water.

Tables 1 and 2 show various specific conditions determined for molecular diffusion of hydrogen fluoride through resin membranes, i.e., the kind of resin, membrane pressure and hydrogen fluoride supply conditions as to the form and concentration of the fluoride and permeability coefficient as related with the partial pressure of hydrogen fluoride.

TABLE 1

| Concentration of hydro-fluoric acid supplied (HF %) | PFA | | FEP | | PE |
|---|---|---|---|---|---|
| | 100% | 80% | 100% | 80% | 80% |
| Standing method | | | | | |
| Permeation time (hr) | 120 | 120 | 120 | 120 | 120 |
| Permeation temp. (°C.) | 23 | 25 | 23 | 25 | 25 |
| HF concn. in tube (%) | 1.055 | 0.305 | 0.628 | 0.180 | 0.229 |
| Permeability coefficient (ml · cm/m² · min · cm Hg) | 1.98 × 10$^{-3}$ | 2.03 × 10$^{-3}$ | 1.18 × 10$^{-3}$ | 1.20 × 10$^{-3}$ | 1.52 × 10$^{-3}$ |
| Flow method Water flow rate 0.1 l/hr | | | | | |
| Temperature (°C.) | 23 | 25 | 23 | 25 | 25 |
| HF concn. in tube (%) | 0.553 | 0.161 | 0.333 | 0.094 | 0.123 |
| Permeability | 1.96 × | 2.02 × | 1.18 × | 1.18 × | 1.54 × |

TABLE 1-continued

| Concentration of hydro-fluoric acid supplied (HF %) | PFA 100% | PFA 80% | FEP 100% | FEP 80% | PE 80% |
|---|---|---|---|---|---|
| coefficient (ml · cm/m² · min · cm Hg) | $10^{-3}$ | $10^{-3}$ | $10^{-3}$ | $10^{-3}$ | $10^{-3}$ |
| Water flow rate 0.1 l/hr | | | | | |
| Temperature (°C) | 23 | 25 | 23 | 25 | 25 |
| HF concn. in tube (%) | 0.055 | 0.016 | 0.033 | 0.009 | 0.012 |
| Permeability coefficient (ml · cm/m² · min · cm Hg) | $1.95 \times 10^{-3}$ | $2.01 \times 10^{-3}$ | $1.17 \times 10^{-3}$ | $1.13 \times 10^{-3}$ | $1.51 \times 10^{-3}$ |

Table 1 shows the concentration of hydrogen fluoride permeating through a resin tube as immersed in hydrofluoric acid and absorbed by ultrapure water, and the permeability coefficient when the water was filled in the tube (standing method) or passed through the tube (flow method). Table 1 shows that a dilute hydrogen fluoride solution flowed out at each of the different water flow rates, and that the permeability coefficient remained definite when the concentration of the original acid was altered and also when the water flow rate was changed, and that the permeability coefficient matched well with the corresponding coefficient value achieved by the standing method.

The conditions relating to the apparatus used are as follows.

| | |
|---|---|
| Inside diameter of the tube | 9 mm |
| Outside diameter of the tube | 10 mm |
| Immersion length of the tube in the water | 100 m |
| Amount of water within the immersed tube | 6.36 l |

Equation for calculating the permeability coefficient $$D = \frac{F(ml) \times d(cm)}{S(m^2) \times (min) \times p(cm\ Hg)}$$

D = permeability coefficient
F = amount of HF (in standard gaseous state)
d = tube wall thickness
S = tube area (average value in logarithm)
T = retention time within the tube
P = partial pressure of hydrogen fluoride

TABLE 2

| Tube | PFA | FEP |
|---|---|---|
| Hydrogen fluoride gas (HF %) | 100 | 100 |
| Standing method | | |
| Permeation time (hr) | 120 | 120 |
| Permeation temp. (°C) | 23 | 23 |
| HF concn. in tube (%) | 1.050 | 0.630 |
| Permeability coefficient (ml · cm/m² · min · cm Hg) | $1.98 \times 10^{-3}$ | $1.18 \times 10^{-3}$ |

Table 2 shows the concentration of hydrogen fluoride permeating through a resin tube as provided in hydrogen fluoride gas and absorbed by ultrapure water, and the permeability coefficient when the water was filled in the tube. The permeability coefficient in the case of hydrogen fluoride gas was comparable to that involved in the case of the solution thereof.

The molecules of hydrogen fluoride are more diffusible that other molecules and can be permeated, as selected from among others, through the tube as contemplated, consequently giving dilute hydrofluoric acid with an ultrahigh purity.

The material to be used for the membrane is not limited specifically insofar as it is chemically stable to hydrofluoric acid. However, when the hydrofluoric acid to be used has a high concentration, fluorocarbon resins are most suitable. Examples of useful fluorocarbon resins are tetrafluoroethylene-perfluoroalkyl vinyl ether copolymer (hereinafter referred to as "PFA"), polytetrafluoroethylene, polychlorotrifluoroethylene, polyvinylidene fluoride polyvinyl fluoride, tetrafluoroethylene-hexafluoropropylene copolymer (FEP), ethylene-tetrafluoroethylene copolymer and the like, among which PFA and FEP are preferable.

Polyethylene (PE) and polyacrylonitrile are satisfactory to use when hydrofluoric acid is of low concentration.

Hydrofluoric acid is satisfactorily usable even if having a purity for industrial use, and can vary from several tens of percent to 100 percent concentration for use. Hydrogen fluoride gas is also usable.

The thickness of the membrane is not limited specifically insofar as it is permeable to hydrogen fluoride. It is preferably about 0.1 to about 3.0mm from the viewpoint of workability and safety of the membrane itself. The membrane can be in the form of a tube and/or partition, or of any construction, provided that it is permeable to hydrogen fluoride. Hydrofluoric acid may be present on either side of the membrane.

The membrane itself is satisfactory to use insofar as it is permeable to hydrogen fluoride. The membrane, which is usually film, sheet or the like, may be a woven or nonwoven fabric.

Next, the apparatus embodying the invention will be described with reference to the drawings.

In principle, the apparatus of the invention comprises a hydrogen fluoride permeating membrane disposed within a container for accommodating hydrogen fluoride or hydrofluoric acid, or ultrapure water. The preferred embodiments of the invention will be given below.

The embodiment shown in FIG. 1 comprises a stainless steel container 1 having a capacity of about 50 liters for hydrofluoric acid or liquid or gaseous hydrogen fluoride, a PFA tube 2 measuring 9mm in inside diameter, 10mm in outside diameter and about 100m in coil length, a container 3 for accommodating ultrapure water, a flow controller 4 for ultrapure water, a filter 5 for removing any trace of fine particles from the absorbing liquid, and a container 6 for the dilute hydrofluoric acid prepared.

To prepare dilute hydrofluoric acid using the apparatus of FIG. 1, hydrofluoric acid or hydrogen fluoride gas is first placed into the container 1, and ultrapure water is passed through the tube 2 from the water container 3 at a rate controlled by the flow controller 4. While the water flows through the tube 2, hydrogen fluoride diffuses through the tube membrane and migrates into the ultrapure water to form dilute hydrofluoric acid, which flows through the filter 5 and is accommodated in the container 6 or used directly.

Although the container 1 of the apparatus of FIG. 1 is used for hydrofluoric acid or hydrogen fluoride gas, this container 1 may be used for accommodating ultrapure water, with the container 3 serving for hydrofluoric acid. This case will be described below in detail with reference to FIG. 2. Ultrapure water is introduced into a container 14 from a water tank 13 via a flow controller 12. On the other hand hydrofluoric acid or hydrogen fluoride gas is caused to flow from a tank 10 through a tube 17 via a flow controller 11 for the molecular diffusion of hydrogen fluoride into the ultrapure water to convert the water in the container 14 to dilute hydrofluoric acid, which is passed through the same filter 15 as above and accommodated in an acid tank 16 or directly used.

Figure 3:
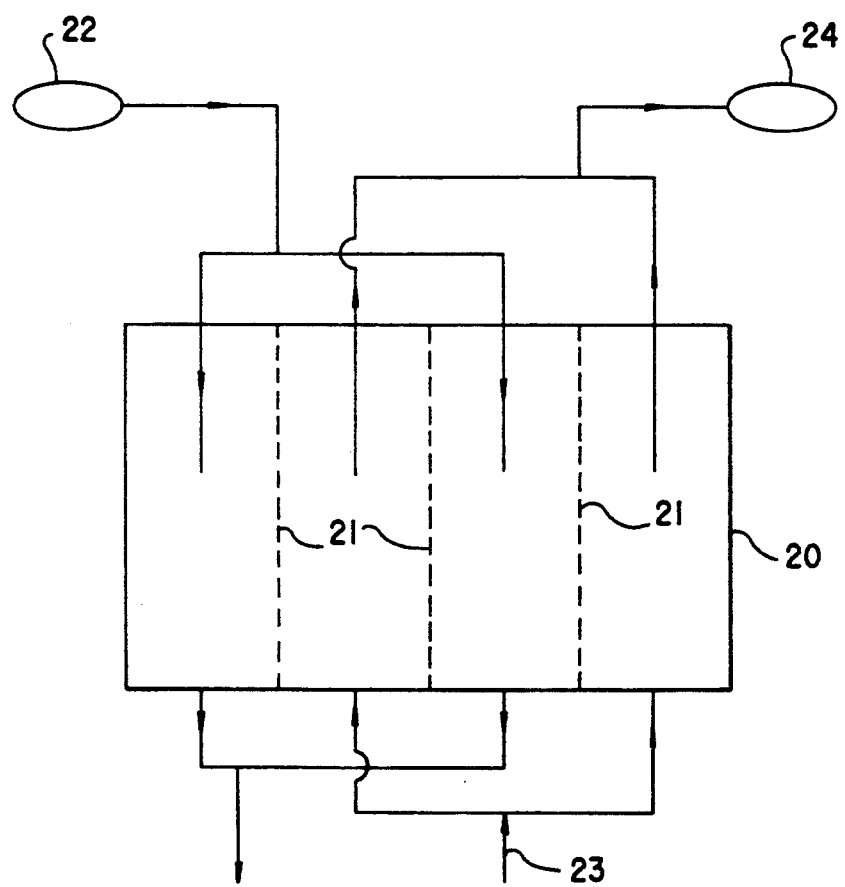
FIG. 3 is a diagram illustrating still another embodiment of the invention.

FIG. 3 is a diagram showing an apparatus of the invention which has partition membranes 21 arranged within a container 20. Indicated at 22 is a hydrogen fluoride inlet, and at 24 a dilute hydrofluoric acid outlet. With the apparatus of FIG. 3, hydrogen fluoride is introduced into the container 20 from the inlet 22, ultrapure water is supplied to the container 20 as indicated at 23, and dilute hydrofluoric acid is delivered from the outlet 24.

Figure 2:
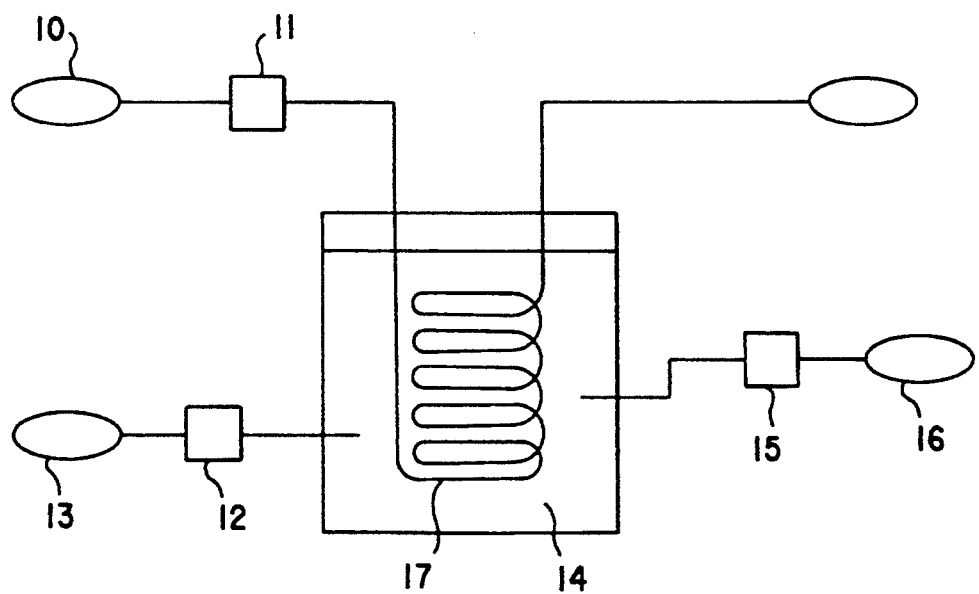
FIG. 2 is a diagram illustrating another apparatus embodying the invention.

The containers of the apparatus shown in FIGS. 1 to 3 are made of metal, resin or metal having a resin lining.

The method of preparing dilute hydrofluoric acid by membrane permeation has outstanding advantages over the conventional container supply method with respect to contaminant control and concentration control. These advantages are as follows.

(1) The on-site system employed is free of contamination due to handling containers or tanks used in a transport and transfer.

(2) The hydrogen fluoride molecular diffusion system used is free of contamination due to the permeation of ion impurities.

(3) The concentration is controllable by an ultrapure water flow control system, which therefore realizes a constant-concentration supply system without necessitating diluting equipment and measurement of concentration.

Table 1 reveals that at a particular temperature or membrane pressure, each resin membrane used achieved a definite rate of hydrogen fluoride permeation by molecular diffusion. Further Table 6 to follow shows that the membrane is impermeable to very high concentrations of ion impurities.

As will be apparent from the foregoing description, the method of the present invention is a perfectly ideal method for supplying dilute hydrofluoric acid. The examples given below specifically reveal that 0.1 to 0.5% solution of hydrogen fluoride can be supplied by the present method and apparatus for use as an etchant or cleaning agent for integrated circuits.

EXAMPLE 1

Using the apparatus shown in FIG. 1, the tube was immersed in liquid hydrogen fluoride, and ultrapure water was filled into the tube or caused to flow through the tube at a specified rate under the conditions listed in Table 3. Table 3 also shows the concentration of dilute hydrofluoric acid obtained.

TABLE 3

| Concentration of hydro-fluoric acid supplied (HF %) | PFA | | FEP | | PE |
|---|---|---|---|---|---|
| | 100% | 80% | 100% | 80% | 80% |
| Standing method | | | | | |
| Permeation time (hr) | 120 | 120 | 120 | 120 | 120 |
| Permeation temp. (°C.) | 23 | 25 | 23 | 25 | 25 |
| HF concn. in tube (%) | 1.055 | 0.305 | 0.628 | 0.180 | 0.229 |
| Flow method | | | | | |
| Water flow rate 0.1 l/hr | | | | | |
| Temperature (°C.) | 23 | 25 | 23 | 25 | 25 |
| HF concn. in tube (%) | 0.553 | 0.161 | 0.333 | 0.094 | 0.123 |
| Water flow rate 0.1 l/hr | | | | | |
| Temperature (°C) | 23 | 25 | 23 | 25 | 25 |

TABLE 3-continued

| Concentration of hydro-fluoric acid supplied (HF %) | PFA | | FEP | | PE |
|---|---|---|---|---|---|
| | 100% | 80% | 100% | 80% | 80% |
| HF concn. in tube (%) | 0.055 | 0.016 | 0.033 | 0.009 | 0.012 |

EXAMPLE 2

In the apparatus shown in FIG. 1 and used in Example 1, the tube was placed in hydrogen fluoride gas, and the same treatment as in Example 1 was carried out. During the treatment, the container 1 was maintained at the specified temperature at all times, and liquid anhydrous hydrofluoric acid was caused to be always present within the container 1. Accordingly, the saturated vapor atmosphere of hydrogen fluoride at the temperature measured was maintained within the container at all times, permitting molecular diffusion of the hydrogen fluoride into the ultrapure water within the tube through the tube wall. The same result as in Example 1 was achieved as lister in Table 4.

TABLE 4

| Tube | PFA | FEP |
|---|---|---|
| Hydrogen fluoride gas (HF %) | 100 | 100 |
| Standing method | | |
| Permeation time (hr) | 120 | 120 |
| Permeation temp. (°C.) | 23 | 23 |
| HF concn. in tube (%) | 1.050 | 0.630 |

EXAMPLE 3

Using the apparatus shown in FIG. 2, the gas or liquid of hydrogen fluoride was passed through the tube, and ultrapure water was passed outside the tube, i.e., through the container, at a controlled rate. Table 5 shows the concentration of hydrofluoric acid obtained.

TABLE 5

| Tube | PFA | |
|---|---|---|
| Hydrogen fluoride in tube | 100% gas | 100% liquid |
| Water flow rate (l/hr) | 0.1 | 0.1 |
| Temperature (°C.) | 23 | 23 |
| Resulting HF concn. (%) | 0.550 | 0.557 |

EXAMPLE 4

To check the influence of impurities in the hydrofluoric acid to be used for absorption, elements other than HF were optionally added to the original hydrofluoric acid, and the concentrations of the elements added and present in the dilute hydrofluoric acid prepared by permeation through the membrane were measured by ICP-MS (Product of Seiko Electronics Co., Ltd.). Table 6 shows the results. To strictly check the permeation of impurities, the measurement was done with ultrapure water held standing. Table 6 reveals that despite the extremely severe condition employed, the concentrations of all the elements were below the limit of detection by ICP-MS, hence no permeation of the elements added. Each of the elements was added, in the form of a fluorine compound and in an amount of 0.5% to 80% HF solution. The same apparatus as in Example 1 was used. The resulting solution was sampled and analyzed after allowing the system to stand at 25° C. for 120 hours.

TABLE 6

|    | PFA    | FEP    | PE     |
|----|--------|--------|--------|
| Al | <0.002 | <0.002 | <0.002 |
| Cr | <0.02  | <0.02  | <0.02  |
| Fe | <0.02  | <0.02  | <0.02  |
| Mg | <0.001 | <0.001 | <0.001 |
| Na | <0.02  | <0.02  | <0.02  |
| Ni | <0.01  | <0.01  | <0.01  |
| Pb | <0.005 | <0.005 | <0.005 |

The dilute hydrofluoric acid provided by the present invention is free from contaminants due to handling involving transport, transfer and use of containers or tanks because of the on-site system employed, and is also free of contamination due to the permeation of ion impurities because of the hydrogen fluoride molecular diffusion system is used. The concentration of the acid is controllable by an ultrapure water flow control system, which therefore realizes a constant-concentration supply system without necessitating diluting equipment and measurement of concentration.

What we claimed is:

1. A method of producing dilute ultrahigh purity hydrofluoric acid, comprising:
    a) providing a resin membrane having two sides, having chemical stability to hydrofluoric acid or hydrogen fluoride gas and allowing molecular diffusion of hydrogen fluoride through the membrane, wherein the resin membrane is a member of the group consisting of tetrafluoroethylene-perfluoroalkyl vinyl ether copolymer, polytetrafluoroethylene, polychlorotrifluoroethylene, polyvinylidene fluoride, polyyvinyl fluoride, tetrafluoroethylene-hexafluorethylene copolymer, ethylene-tetrafluoroethylene copolymer, polyethylene, and polyacrylonitrile;
    b) providing hydrofluoric acid or hydrogen fluoride gas on one side of the membrane and ultrapure water on the second side of the membrane, whereby the hydrofluoric acid or hydrogen fluoride gas diffuses through the membrane, but trace impurities do not diffuse through the membrane, into the ultrapure water to form dilute ultrahigh purity hydrofluoric acid; and
    c) collecting dilute ultrahigh purity hydrofluoric acid from the second side of the membrane.

2. A method of producing dilute ultrahigh purity hydrofluoric acid as defined in claim 1, wherein the resin membrane having two sides of step (a) is in the form of a tube having an inside and an outside, and step (b) further comprises flowing the ultrapure water inside the tube.

3. A method of producing dilute ultrahigh purity hydrofluoric acid as defined in claim 1, wherein the resin membrane having two sides of step (a) is in the form of a tube having an inside and an outside, and step (b) further comprises flowing the hydrofluoric acid or hydrogen fluoride gas inside the tube.

* * * * *